Aug. 14, 1928.
A. F. SHORE
CLIP
Filed July 5, 1923
1,680,435
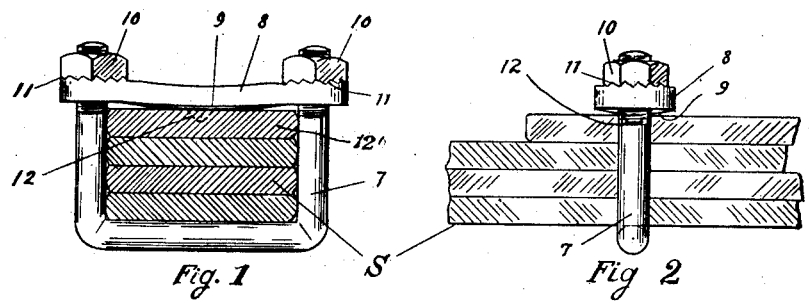
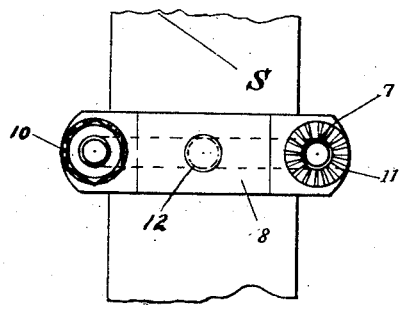
Fig. 3
INVENTOR
Albert F. Shore,
BY
Geo. Hoffman
ATTORNEY Patented Aug. 14, 1928.

1,680,435

UNITED STATES PATENT OFFICE.

ALBERT F. SHORE, OF NEW YORK, N. Y.

CLIP.

Application filed July 5, 1923. Serial No. 649,633.

My invention relates to improvements in clips for use with multiple leaf springs for vehicles, and which improvements are especially effective when applied to such springs of the softer variety or which have a longer period of vibration.

One object of the invention is to provide a clip of this character adapted to hold the leaves of the spring in proper alignment.

Another object is to provide means for applying a predetermined elastic or yielding but firm pressure on the spring and simultaneously increasing the friction of the leaves against one another to enhance the resistance of said spring against movement of the vehicle body, and also eliminating rattling of the spring leaves as a result of wear, as well as eliminating the smaller or lesser vibrations of the vehicle body and reducing to a minimum the larger or greater vibrations or shocks caused by irregularities in the roadbed.

Still another object of the invention is to provide means for adjusting said elastic or yielding means.

These and other objects of the invention not hereinbefore mentioned will be hereinafter described and claimed and are illustrated in the accompanying drawing, in which Figure 1 is a cross-section of a multiple leaf spring with the preferred form of my invention applied thereto.

Fig. 2 is a side elevation, looking from the left of Fig. 1, only a portion of the spring being shown; and Fig. 3 is a plan view.

In carrying out the embodiment of my invention illustrated in the drawing, I provide a clip having a non-elastic U-shaped member 7 adapted to receive the spring-bar clamping-plate 8. The U-shaped member 7 holds the leaves of the spring in proper alignment and this member is shown as of rectangular shape, although it may be of any other desirable conformation. The spring-bar clamping-plate 8 is adapted to engage the spring transversely of its face, said bar having openings at its extremities for receiving the threaded ends of the U-shaped member 7. This bar is made of any suitable springy or yielding material, preferably heat treated steel, and is not only of bow or convex shape from end to end, to provide a convex surface intermediate its ends, but is also of rounded or convex form in cross-section or from side to side and hence this bow and convex portion of the bar is adapted to engage with the face of the spring, as shown at 9 in Figs. 1 and 2. The bar 8 is attached to the threaded ends of the U-shaped member 7 by nuts 10. The bow and convex arrangement of the bar forces the ends of the bar away from the spring S, and by screwing the nuts 10 onto the threaded ends of the U-shaped member, said member and the bar will be yieldingly or elastically drawn about and clamped to the leaves of the spring, thus exerting an elastic force or pressure thereupon, and this tension or pressure may in that way be increased or decreased to a predetermined extent.

To prevent the loosening of the nuts 10 by vibration, and to hold and lock the nuts against rotation, the extremities of the bar 8 are provided with serrations 11 and which serrations are circumferentially disposed about and extending radially from the openings in said bar. The under faces of the nuts 10 are similarly provided with corresponding serrations, as clearly shown in Figs. 1 and 2. A predetermined pressure is applied to the spring S by the drawing and locking of the nuts onto the serrated ends of the bar 8 and this pressure is elastic or yielding but still firm in character because of the springy material of which the bar is made. When the clip has thus been arranged in normal position upon the spring S, it not only serves to hold the leaves of the spring in proper alignment but increases the friction of the leaves against one another and thus enhances the resistance of the spring against movement of the vehicle body to which it is attached and also eliminates rattling of the spring leaves as well as the lesser vibrations of the vehicle and reduces to a minimum the larger vibrations or shocks caused by irregularities in the highway.

The non-elastic U-shaped member is shown to be made of round stock whereby it will have a convex surface contact with the leaves of the spring S similar to the bar 8, whereby the clip as a unit is adapted to rock as the leaves of the spring are moved longitudinally relatively to each other by the flexing of the spring. It is, of course, understood that the U-shaped member may be of flat stock or stock of other cross-sectional form. To anchor the clip and prevent movement thereof longitudinally of the spring, the bar 8 is provided with a protuberance or tit 12, preferably cone shaped, to engage in a correspondingly formed depression or recess in the outer leaf 12' of the spring S. It is obvious that the elastic or yielding tension or force which is applied to the spring by the clip, may be varied at will by manipulating the nuts 10 upon the ends of the bar 8 and the U-shaped member 7. In this arrangement, the clip may be applied to the spring before or after the latter has been connected to the vehicle.

I claim:

The combination with a multiple leaf-spring, of a yoke member to engage about the spring with the yoke legs engaging the sides of the spring and the connecting portion of the yoke engaging one face of the spring, a bowed bar of resilient material having perforations for the engagement thereof on the legs of said yoke member with the convex surface of the bar in engagement with the spring, the said bar being arranged with serrations extending radially from and about the perforations therein, and nuts threaded on to the ends of the legs of said yoke member to yieldingly draw the yoke member and bar together, said nuts having one face thereof serrated to correspond with the serrations of the bar and co-operate therewith to lock the nuts on the yoke legs.

In testimony whereof, I affix my signature.

ALBERT F. SHORE.